United States Patent [19]

Ensch et al.

[11] Patent Number: 5,429,226
[45] Date of Patent: Jul. 4, 1995

[54] CONVEYOR CHAIN FOR CARRYING OBJECTS

[75] Inventors: Peter J. Ensch, Wauwatosa; Dennis A. Woyach, Milwaukee, both of Wis.

[73] Assignee: Rexnord Corporation, Milwaukee, Wis.

[21] Appl. No.: 168,527

[22] Filed: Dec. 15, 1993

[51] Int. Cl.⁶ .................................. B65G 17/36
[52] U.S. Cl. ..................... 198/803.14; 198/803.01
[58] Field of Search .................. 198/803.01, 803.14

[56] References Cited

U.S. PATENT DOCUMENTS

| | | | |
|---|---|---|---|
| 3,206,005 | 9/1965 | Lyman | 198/131 |
| 3,342,304 | 9/1967 | Greulich | 198/803.14 X |
| 3,481,817 | 12/1969 | Mutter et al. | 198/803.01 X |
| 3,578,144 | 5/1971 | Punzak | 198/41 |
| 3,610,407 | 10/1971 | Prodzenski | 198/803.01 |
| 3,675,759 | 7/1972 | Koppe | 198/131 |
| 3,765,458 | 10/1973 | Ziegler et al. | 139/126 |
| 3,842,968 | 10/1974 | Owens | 198/189 |
| 3,967,712 | 7/1976 | Waitkins et al. | 193/1 |
| 3,983,990 | 10/1976 | Gardy et al. | 198/803.14 |
| 4,096,943 | 6/1978 | Gentsch | 198/793 |
| 4,189,996 | 2/1980 | Ackley, Sr. et al. | 198/803.14 X |
| 4,388,990 | 6/1983 | Michalik | 198/645 |
| 4,560,058 | 12/1985 | Enochs et al. | 198/426 |
| 4,629,063 | 12/1986 | Hodlewsky et al. | 198/853 |
| 4,809,846 | 3/1989 | Hodlewsky et al. | 198/853 |
| 4,909,380 | 3/1990 | Hodlewsky | 198/779 |
| 4,953,691 | 9/1990 | Janzen | 198/803.01 |
| 5,000,311 | 3/1991 | Abbestam et al. | 198/803.01 |
| 5,096,050 | 3/1992 | Hodlewsky | 198/779 |
| 5,101,966 | 4/1992 | Lapeyre | 198/803.14 |
| 5,125,503 | 6/1992 | Ueberreiter et al. | 198/803.01 |
| 5,127,514 | 7/1992 | Guttinger et al. | 198/803.11 |

FOREIGN PATENT DOCUMENTS

| | | | |
|---|---|---|---|
| 1132477 | 9/1982 | Canada | 198/803.01 |
| 3404580 | 9/1985 | Germany . | |
| 3712139 | 10/1988 | Germany | 198/803.01 |
| 3133827 | 6/1991 | Japan | 198/803.14 |
| 4007208 | 1/1992 | Japan | 198/803.14 |
| 1046164 | 10/1983 | U.S.S.R. . | |

*Primary Examiner*—James R. Bidwell
*Attorney, Agent, or Firm*—Michael, Best & Friedrich

[57] ABSTRACT

A conveyor chain for conveying an object including a top plate having a flat base portion with an upper surface and a plurality of retaining members extending upwardly from the base portion, and a product support member that is removably secured to the top plate via the retaining members the product support member has an upper surface including a recess which houses the object to be conveyed and has a configuration that is complementary to the configuration of the object to be housed.

10 Claims, 2 Drawing Sheets

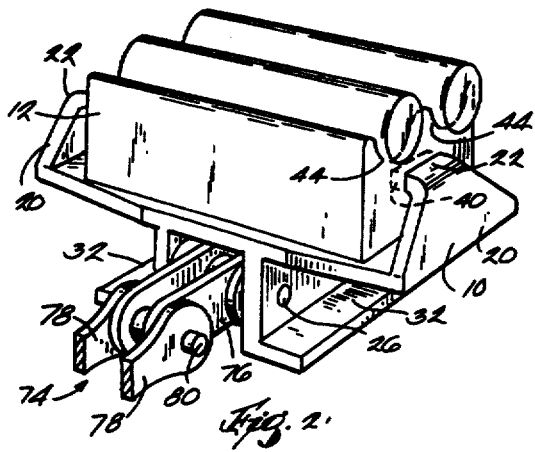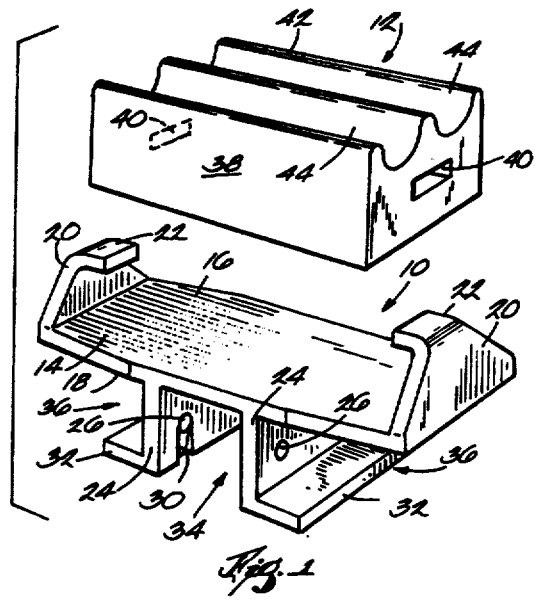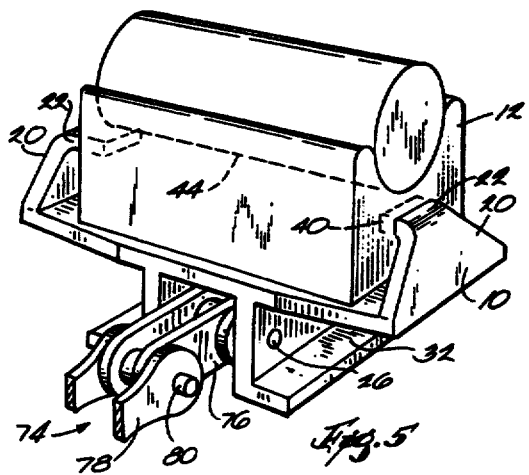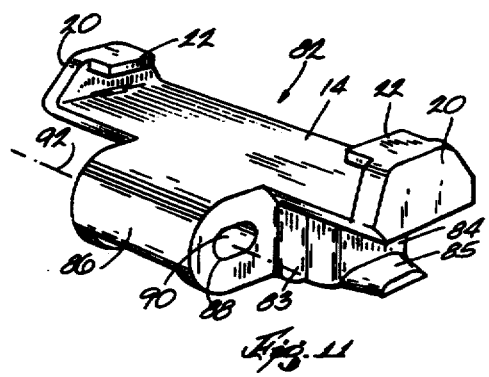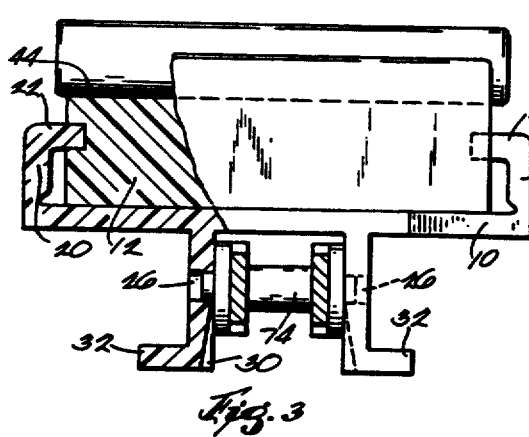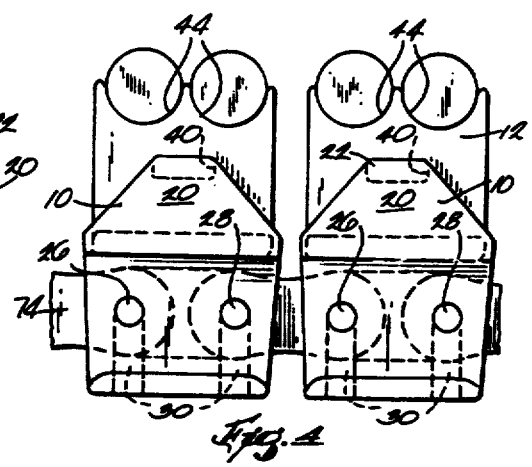

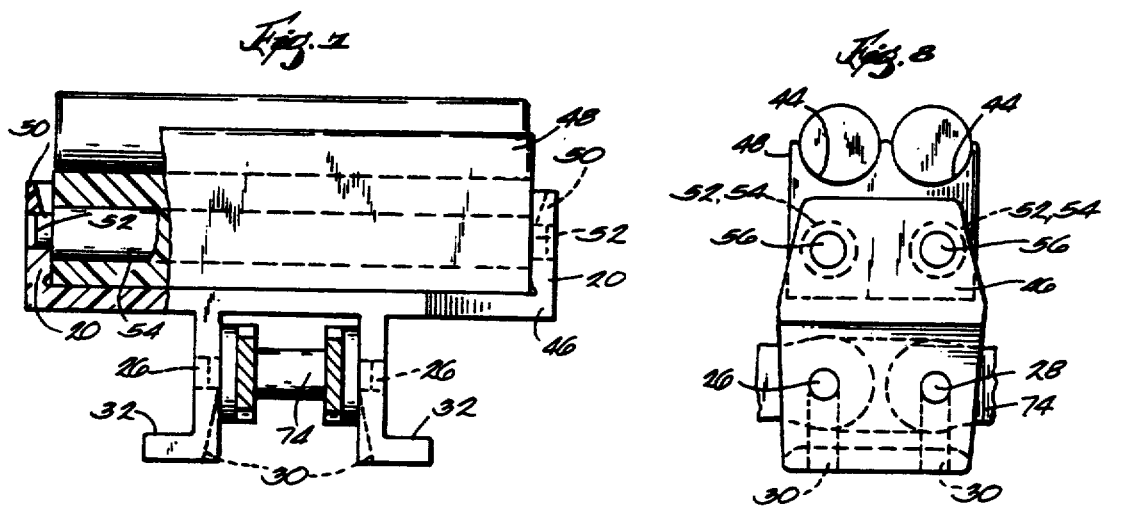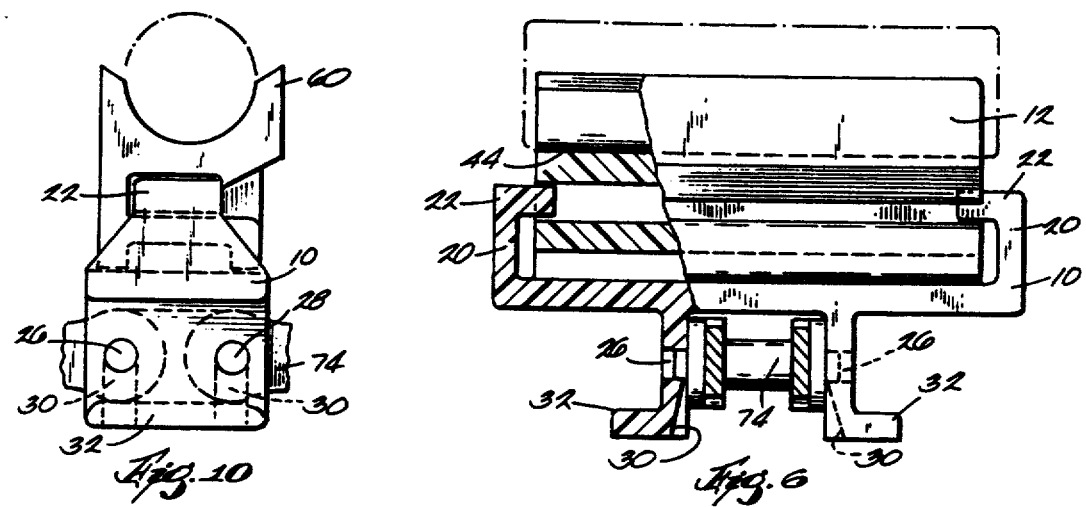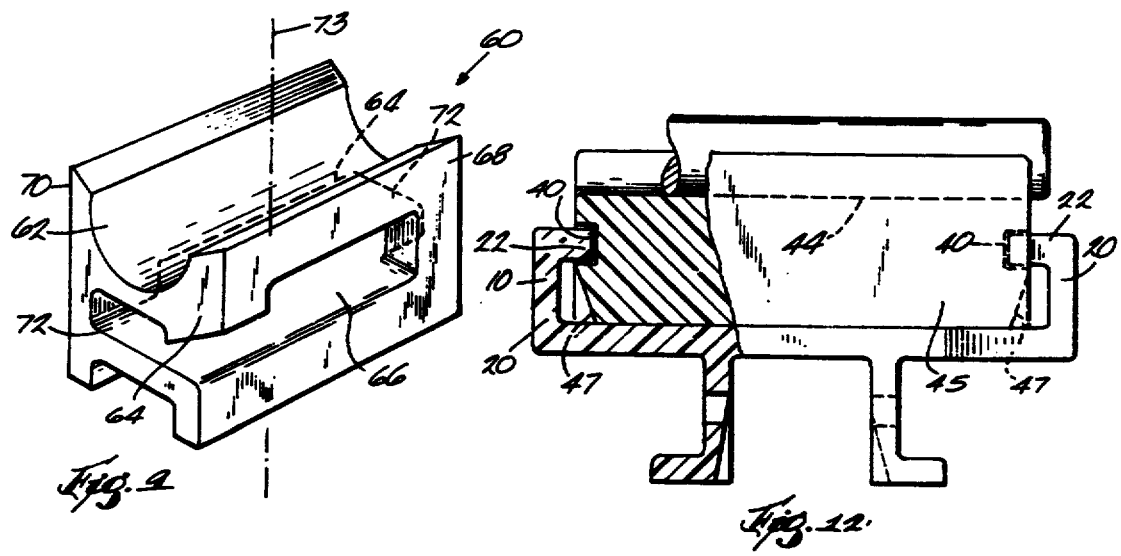

CONVEYOR CHAIN FOR CARRYING OBJECTS

FIELD OF THE INVENTION

The invention relates to conveyor chains and, more particularly, to conveyor chains including attachments for carrying objects.

BACKGROUND OF THE INVENTION

Some objects, such as cylindrical objects, can be difficult to convey on conveyor chains due the natural instability caused by their geometry. If the cylindrical objects are positioned such that they are permitted to roll on the conveyor surface, control of the position of the objects cannot be maintained and they can jam the conveyor chain and conveyor. In the case of cylindrical objects which have a height that is considerably greater than their diameter, if they are positioned on end on the conveyor chain, they will typically have a relative high center of gravity and will be naturally unstable. This instability can result in tipage while the object is being handled. Such tipage in a manufacturing operation can cause jam-ups and result in costly down time of production.

Increased demands on productivity have also required on-line quality control checks involving electronic, pneumatic, mechanical and optical controls for inspecting or testing objects while they are being conveyed. These on-line inspections require the objects to be properly aligned and secured with little relative motion other than the desired conveying motion.

SUMMARY OF THE INVENTION

The invention provides a conveyor chain made up of a plurality of top plates, at least some of the top plates including a product support member having a configuration specifically adapted to support and convey an object. The top plates, which support product support members, include a flat base portion with an upper surface and a plurality of retaining members extending upwardly from the base portion. The product support member is removably secured to the top plate by retaining members. The product support member has an upper surface including a recess. The recess houses at least a portion of the object to be conveyed and has a configuration that is complementary to the configuration of the housed object.

It is a feature of the invention to provide a reliable, versatile and economical conveyor chain for use in conveying objects that are difficult to handle due to their natural instability.

It is another feature of the invention to provide a conveyor chain that provides reliable positioning and handling of unstable objects by holding the objects in such a manner as to use the objects own natural instability to hold them in place.

It is another feature of the invention to provide a conveyor chain that provides consistent product orientation.

It is another feature of the invention to provide a conveyor chain that enables handling of difficult to convey objects that are to be carried in many directions, turns, inclines, and declines and thus provide greater flexibility to conveyor lay-outs and flow of objects within a given production facility.

Other features and advantages of the invention will become apparent to those of ordinary skill in the art upon review of the following drawings, detailed description and claims.

BRIEF DESCRIPTION OF THE DRAWINGS

FIG. 1 is an exploded perspective view of a top plate and a product support member embodying the invention;

FIG. 2 is a perspective view of a conveyor chain assembly depicting the top plate and product support member of FIG. 1 positioned on a chain;

FIG. 3 is a partial sectional view of the conveyor chain assembly shown in FIG. 2;

FIG. 4 is a side elevational view of two conveyor chain assemblies as singely shown in FIG. 2;

FIG. 5 is a view similar to FIG. 2 showing an alternate embodiment of the product support member;

FIG. 6 is a partial sectional view of the conveyor chain assembly shown in FIG. 5;

FIG. 7 is a partial sectional view of a conveyor chain assembly including an alternate embodiment of a top plate and an alternate embodiment of a product support member;

FIG. 8 is a side elevational view of the conveyor chain assembly of FIG. 7;

FIG. 9 is a perspective view of an alternate embodiment of a product support member;

FIG. 10 is a side elevational view of a conveyor chain assembly including the product support member of FIG. 9;

FIG. 11 is a perspective view of an alternate embodiment of the top plate which is integral with a chain link; and FIG. 12 is a view similar to FIG. 3 showing an alternate embodiment of a product support member.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Referring to the drawings, there is shown in FIG. 1 a top plate 10 including a product support member 12 embodying the invention. The top plate 10 has a flat base portion 14 with an upper surface 16 and a lower surface 18. A pair of triangular-shaped retaining members 20 extend upwardly from the periphery of the base portion 14. An inward extension 22 extends toward the center of the base portion 14 from the uppermost part of each retaining member 20. A pair of legs 24 depends from the lower surface 18 of the base portion 14, each leg 24 having two eyes 26 and 28 (FIG. 4) such that the eyes 26 and 28 in one leg 24 are axially aligned with the eyes 26 and 28 in the other leg 24. On the lowermost portion of each leg 24, below and in communication with each eye 26 and 28, is a ramp portion 30. A flange 32 extends outwardly from the lowermost portion of each leg 24. The legs 24 and flanges 32 in conjunction with the lower surface 18 of the base portion 14 form an inner channel 34 for receiving a chain. In addition, the legs 24 and flanges 32 in conjunction with the lower surface 18 of the base portion 14 form a pair of outer channels 36 for receiving a guide rail of a conveyor frame.

In the embodiment of the invention shown in FIG. 1, the product support member 12 includes a body 38 having therein a pair of apertures 40, one aperture 40 on each end of the body 38. Alternatively, a single bore could run the length of the body 38 and terminate in aperture 40 on each end of the body. The body 38 has an upper surface 42 including two recesses 44. The recesses 44 house the objects to be conveyed and have a configuration that is complementary to the configuration of the objects. It should be noted that the product support member 12 can have any number of recesses 44. For example, the product support members 12 depicted in FIGS. 1-4 and 12 have two recesses 44 that can house two cylindrical objects such as batteries. In another embodiment, the product support members 12 has a single recess 44 for holding a single object such as shown in FIGS. 5-6. It should be noted that the recesses 44 of the product support members 12 depicted in the drawings are shown to be semi-cylindrical. However, it should be appreciated that the recesses 44 could have other configurations complementary to the configuration of the object to be conveyed. The recesses 44 can be of various geometries specifically designed to make use of the instability of the object in such a way as to force the object to fall into a state of equilibrium. Examples of difficult to convey objects include engine cylinders, pharmaceutical vials and batteries. These objects are difficult to convey because their natural instability causes them to tip over easily.

The product support member 12, as depicted in FIGS. 1-6, is removably securable to the top plate 10 via the inward extensions 22 on the top plate 10 and the apertures 40 in the product support member 12. To secure the product support member 12 on the top plate 10, the product support member 12 is deformed slightly to enable the inward extensions 22 to be inserted into the apertures 40. The product support member 12 is then released and reforms to its natural state thus securing itself in place on the top plate 10. To remove the product support member 12, the product support member 12 is deformed such that the inward extensions 22 can slide out from the apertures 40.

Referring now to FIG. 12, an alternate embodiment of the product support member 45 for use with top plate 10 is depicted. The product support member 45 includes lead-ins 47, one on each end of the product support member 45. To secure the product support member 45 to the top plate 10, the product support member is lowered such that the lead-ins 47 contact the respective retaining member 22 of the top plate 10. Further downward movement of the product support member 45 causes the retaining member 22 to deflect outwardly allowing the retaining members 22 to be positioned in the apertures 40 on the product support member. To remove the product support member 45 from the top plate 10, the retaining members 22 are deflected outwardly to allow the retaining members 22 to be removed from the respective apertures 40.

Referring to FIGS. 7 and 8, there is shown another embodiment of the invention which includes a top plate 46 and a product support member 48. The top plate 46 is similar to top plate 10 depicted in FIGS. 1-6 except for the following. The top plate 46 includes retaining members 20 each having chamfered portions 50 instead of inward extension 22. A shaft channel 52 is below and in communication with each chamfered portion 50. The product support member 48 is similar to the product support member 12 depicted in FIGS. 1-6 except for the following. The product support member 48 includes a pair of longitudinal bores 54 running the length of the product support member 48 instead of a pair of apertures 40. To removably secure the product support member 48 to the top plate 46, a pair of shafts 56 are utilized that are longer than the length of the bores 54. One shaft 56 is inserted into each longitudinal bore 54 such that each shaft 56 extends the length of its respective bore 54 and protrudes from each end of the bore 54. The product support member 48, with shafts 56 inserted, is aligned with the top plate 46 such that the protruding ends of the shafts 56 align with the chamfered portions 50 of the top plate 46. Downward movement of the product support member 48 causes the retaining members 20 of the top plate 46 to deform slightly outwardly allowing the protruding ends of the shafts 56 to slide along the chamfered portion 50 then snap into the shaft channel 52. To remove the product support member 48 from the top plate 46, the retaining members 20 of the top plate 46 must be deflected outwardly to allow the ends of the shafts 56 to clear the retaining members 20 when the product support member 48 is raised vertically.

Referring to FIGS. 9 and 10, there is shown another embodiment of the invention including top plate 10 and a product support member 60. The top plate 10 is identical to that described in conjunction with FIG. 1. The product support member 60 has a configuration as best shown in FIG. 9. The product support member 60 has a body 62 having a pair of angled portions 64. The body 62 has therein a recess 66. The recess 66 is shaped as to open up to the opposing faces 68 and 70 of the body 62. The body 62, in conjunction with the recess 66, forms a pair of snap-fits 72, one on each end of the product support member 60. To secure the product support member 60 to the top plate 10, the product support member 60 is placed on the base portion 14 and rotated about an axis 73. Upon rotation, the product support member 60 engages the inward extensions 22 on each side of the top plate 10 and the angled portions 64 of the body 62 deflect upwardly allowing the inward extensions 22 to snap into the recess 66, and more specifically the snap-fits 72, and be held in place by the angled portions 64. The snap-fits 72 create a positive lock to hold the product support member 60 fixed to the top plate 10. A rotational load would have to be applied to the product support member 60 to remove it from the top plate 10. A rotational load is not a natural load commonly found in the conveying process. To remove the product support member 60 from the top plate 10, the product support member 60 is rotated so that the angled portions 64 deflect upwardly and the inward extensions 22 can clear the snap fits 72 and recess 66.

As shown in FIGS. 2-8 and 10, the top plate 10 or 46 is positioned over and secured to a chain 74. As shown in FIG. 2, the chain 74 includes bushing links 76 and pin links 78 connected together by a plurality of chain pins 80. To secure the top plate 10 to the chain 74, the chain 74 is positioned in the inner channel 34 of the top plate 10. The top plate 10 is then aligned and pressed downwardly onto the chain 74 so that a chain pin 80 contacts the ramp portion 30 associated with each eye 26 and 28 on each leg 24. As the top plate 10 is pushed progressively downwardly, the chain pins 80 acting on the ramp portions 30, spreads legs 24 apart until the chain pins 80 reach the eyes 26 or 28 respectively at which point the legs 24 snap back into position, thus fixing the top plate 10 on the chain 74. Product support members 12, 46 or 60, adapted to carry various objects, can then be secured to the to plate 10 via the various methods previously described.

The invention also includes an alternate embodiment of a top plate 82 as shown in FIG. 11. In this embodiment, the top plate 82 is integrally connected to a chain link 83. The top plate 82 includes a base portion 14 and retaining members 20. The chain link 83 includes a pair of legs 84, flanges 85, and a barrel 86 of which only one leg 84 and flange 85 can be seen in FIG. 11. Each leg 84 has thereon a coaxially aligned aperture (not shown). The barrel portion 86 extends outwardly from the legs 84. The barrel portion 86 is integral with both the legs 84 and the base portion 14. The barrel portion 86 has a wall 88 defining a bore 90 passing through the barrel portion 86. The barrel portion 86 and the bore 90 include a coaxial axis 92 running in a direction transverse to the direction of movement of the chain link 83 when it is moving and parallel to the coaxially aligned apertures of each leg 84. The rearward portions of legs 84 are dimensioned such that the barrel portion 86 of one chain link 83 will fit between the legs 84 of an adjacent chain link 83 so that a pin can be inserted through the coaxially aligned apertures in the legs 84 of one chain link 83 and the bore 90 of the barrel portion 86 of the other chain link 83 in order to fasten adjacent chain links 83 together. A product support member 12, 45 or 60 can be removably secured to the chain link 83 as previously described. Additionally, the top plate 82 of the chain link 83 can be altered to accommodate the product support member.

The various embodiments of the product support members can be made of a resilient material to provide a cushion for the product being conveyed and to provide ease of securing the product support members to the top plate. Such resilient material could be a variety of materials including rubber, foam or plastic such as NEOPRENE or EPDM. The product support member can also be made of a harder material if product cushioning is not required or if securing of the top plate does not require a more flexible material. The product support member can be formed by extrusion or injection molding. With extrusion, the product support members 12, 48 and 60 can be extruded of materials such as aluminum or an extrusion grade thermoplastic such as nylon, acetal, polyester or PVC. Thermoplastics offer benefits such as low costs, chemical resistance, good snap fit resistance, low coefficient of friction and non-corrosion.

The ease of installation of the product support members to the top plates permit a single conveyor chain to have the ability to hold several different styles of product support members, thus allowing very specific, detailed, and tailored product support members to be used for a variety of unstable objects on a single chain.

We claim:

1. A conveyor chain for conveying an object, the conveyor chain comprising:
   a chain;
   a top plate having a flat base portion with an upper surface, a front edge portion, a rear edge portion and at least a pair of space-apart retaining members extending upwardly from the base portion;
   means for attaching the top plate to the chain such that the top plate is centered over the chain; and
   a product support member removably secured to the top plate, the product support member having an upper surface including at least one generally semi-cylindrical recess, the semi-cylindrical recess adapted to house the object, the product support member being supported on the base portion of the top plate between the front edge portion and the rear edge portion of the top plate between the retaining members and the product support member between resiliently deformable such that it can be positioned between the retaining members and resiliently engaged by the retaining members.

2. A conveyor chain for conveying an object as set forth in claim 1 wherein the attaching means includes a pair of legs depending from the base portion, each leg having therein a plurality of aligned apertures and having thereon a pair of outwardly extending flanges, and a chain pin extending through the apertures and the chain.

3. A conveyor chain for conveying an object as set forth in claim 1 wherein the product support member has therein an aperture, wherein the retaining member has thereon an inward extension, and wherein the product support member is supported on the base portion by the retaining member by insertion of the extension into the aperture.

4. A conveyor chain for conveying an object as set forth in claim 3 wherein the aperture of the product support member defines a side-opening slot and wherein the extension is inserted into the slot via rotational movement of the product support member about a vertical axis.

5. A conveyor chain for conveying an object, the conveyor chain comprising:
   a plurality of chain links each including a top plate having a flat base portion with an upper surface and having a plurality of retaining members extending upwardly from the base portion, and a barrel depending from the top plate, the barrel having a throughgoing bore;
   a plurality of chain pins, one chain pin being positioned in each bore to hingedly join adjacent chain links; and
   a product support member removably secured to the chain link, the product support member having an upper surface including at least one recess, the recess adapted to house the object and having a configuration that is complementary to the configuration of the housed object, and being supported on the chain link by the retaining members.

6. A conveyor chain for conveying an object as set forth in claim 5 wherein the product support member has therein an aperture on each end, wherein each of the retaining members have thereon an inward extension, and wherein the product support members are removably secured on the chain link by insertion of the extensions into the apertures.

7. A conveyor chain for conveying an object as set forth in claim 6 wherein the apertures of the product support member define side-opening slots and wherein the extensions are inserted into the slots via rotational movement of the product support member about a vertical axis.

8. A conveyor chain for conveying an object as set forth in claim 5 wherein the product support member has at least one throughgoing bore, wherein the chain link further includes a shaft having opposite ends, and wherein the shaft extends through the bore and each end of the shaft is releasably secured to the retaining members of the chain link.

9. A chain assembly for conveying an object, the chain assembly comprising:
- a top plate having a flat base portion with an upper surface and a plurality of retaining members extending upwardly from the base portion; and
- a product support member, removably securable to the top plate, the product support member having an upper surface including at least one recess adapted to house the object and having a configuration that is complementary to the configuration of the object, and the product support member securable on the base portion of the top plate by the retaining members, the product support member having at least one throughgoing bore, and the top plate further including a shaft having opposite ends, and the shaft extending through the bore and each end of the shaft secured to the retaining members of the top plate.

10. A conveyor chain for conveying an object, the conveyor chain comprising:
- a chain;
- a top plate having a flat base portion with an upper surface and at least one retaining member extending upwardly from the base portion;
- means for attaching the top plate to the chain; and
- a product support member removably secured to the top plate, the product support member having an upper surface including at least one recess, the recess adapted to house the object and having a configuration that is complementary to the configuration of the housed object, and being supported on the base portion of the top plate by the retaining member, and the product support member having at least one throughgoing bore, and the top plate further including a shaft, and the shaft extends through the bore and is releasably secured to the retaining member of the top plate.

* * * * *